United States Patent
Bormann et al.

(10) Patent No.: US 6,799,235 B2
(45) Date of Patent: Sep. 28, 2004

(54) DAISY CHAIN LATENCY REDUCTION

(75) Inventors: David S. Bormann, Sunnyvale, CA (US); Kirk W. Skeba, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 428 days.

(21) Appl. No.: 10/038,325

(22) Filed: Jan. 2, 2002

(65) Prior Publication Data

US 2003/0126333 A1 Jul. 3, 2003

(51) Int. Cl.[7] .......................... G06F 13/14; H04L 12/28
(52) U.S. Cl. ....................... 710/110; 710/305; 370/351
(58) Field of Search .................................. 710/105–106, 710/110, 305, 8–19; 709/238–244; 370/351, 395.3

(56) References Cited

U.S. PATENT DOCUMENTS

| | | | | |
|---|---|---|---|---|
| 4,642,473 A | * | 2/1987 | Bryant | 307/38 |
| 5,038,317 A | * | 8/1991 | Callan et al. | 710/301 |
| 5,130,976 A | * | 7/1992 | Hickey et al. | 370/396 |
| 5,222,218 A | * | 6/1993 | Smith | 710/111 |
| 5,335,352 A | * | 8/1994 | Yanai et al. | 710/51 |
| 5,761,697 A | * | 6/1998 | Curry et al. | 711/100 |
| 5,901,325 A | * | 5/1999 | Cox | 710/1 |
| 5,983,286 A | * | 11/1999 | Pakenham | 710/9 |
| 6,546,441 B1 | * | 4/2003 | Lum | 710/72 |
| 6,654,834 B1 | * | 11/2003 | Robertson et al. | 710/107 |
| 6,665,742 B2 | * | 12/2003 | Owen et al. | 710/10 |
| 2003/0012181 A1 | * | 1/2003 | The | 370/352 |
| 2003/0074505 A1 | * | 4/2003 | Andreas et al. | 710/110 |

* cited by examiner

Primary Examiner—Sumati Lefkowitz
(74) Attorney, Agent, or Firm—Blakely, Sokoloff, Taylor & Zafman LLP

(57) ABSTRACT

Transmitting data on a serial data transmission path to reduce latency including reading only enough of a device address of a serial data word to determine if the serial data word is addressed to a first device having an address, wherein the serial data word is transmitted across a first link of a first serial data transmission path to the first device and passing the serial data word across a second link of the first serial data transmission path to a second device if the serial data word is not addressed to the first device.

40 Claims, 3 Drawing Sheets

DAISY CHAIN LATENCY REDUCTION

BACKGROUND OF THE INVENTION

1. Field of Invention

This invention relates generally to high-speed serial bus operation, and more specifically to low latency techniques applied to a multi-link serial bus architecture.

2. Art Background

A data bus is commonly used in data processing devices such as a computer to send and receive data from a plurality of devices. Data buses have been constructed around a serial or a parallel architecture. For example, a serial data bus can connect together a printer, a scanner, a storage device, and a wireless transceiver to facilitate communication between devices. Such a configuration of devices connected sequentially is known in the art as a daisy chain.

A controller is used to send data to a first device on the serial data bus. Data prepared for transmission on a serial data bus can be referred to in the art as a packet of data. The packet of data typically has an address corresponding to a unique device on the serial data bus. The data stream transmitted onto the serial data bus can consist of a sequence of packets randomly addressed to different devices distributed along the serial data bus.

In serial data bus architecture, a plurality of bits (a bit stream) is transmitted sequentially in time across a data transmission path. Thus, a first bit is followed by a second bit, etc., eventually completing the transmission of a first data word and then a second data word. Data transfer accomplished using serial data bus architecture has traditionally suffered from high latency. Current serial data bus protocol requires the transmission of the serial data word or packet to the first device in the daisy chain and then from the first device to the second device in the daisy chain, progressing down the serial data bus to the last device. According to present bus architecture, each device along the serial data bus reads the packet of data, checks it for errors and then retransmits the packet to the next device if the packet address did not match the given device address. If an error is found, the device notifies the controller along a second serial data transmission path and the controller responds to the error condition.

Such a protocol suffers from high latency, since each device must read the data and perform an error check on the packet of data, even if the packet of data is not addressed to the device performing the check.

BRIEF DESCRIPTION OF THE DRAWINGS

The present invention is illustrated by way of example and is not limited in the figures of the accompanying drawings, in which like references indicate similar elements.

DETAILED DESCRIPTION

In the following detailed description of embodiments of the invention, reference is made to the accompanying drawings in which like references indicate similar elements, and specific embodiments in which the invention may be practiced are shown by way of illustration. These embodiments are described in sufficient detail to enable those skilled in the art to practice the invention. The following detailed description is, therefore, not to be taken in a limiting sense, and the scope of the invention is defined only by the appended claims.

A low latency high-speed serial data bus is disclosed that reduces latency by 90% (in one embodiment) over present serial data bus protocols. Error checking is postponed until the serial data word or data packet reaches the destination device. Along the serial data transmission path a device only reads as much of the address of the serial data word as is necessary for the device to determine if the serial data word is addressed to the device. The device does not read the entire data word if the device is not the addressee of the serial data word. Latency is reduced accordingly, since devices in between the controller and the destination device do not read the entire data word. Once the serial data word has arrived at the destination device, the destination device reads the entire serial data word address and determines a match; then the device reads the data word. Error checking occurs and if an error condition is found, the device notifies the controller via a second data transmission path. In one embodiment, a 20-bit serial data word has a 2-bit address. Reading the 2-bit address instead of reading the entire 20 bit serial data word and performing error checking reduces the latency of the data transfer by at least 90%.

Figure 1:
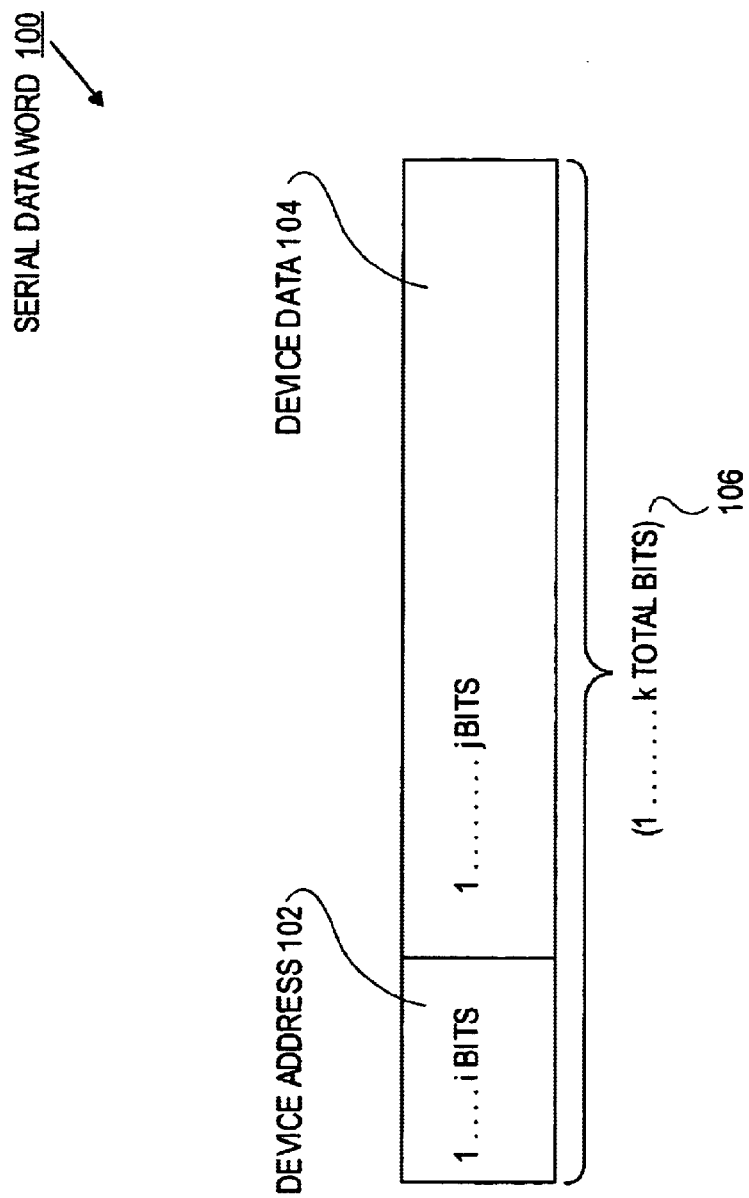
FIG. 1 illustrates a serial data word or packet of data.

A serial data word or packet is shown in FIG. 1 at 100. The serial data word 100 includes a device address 102 and device data 104. The device address can be one or more bits in length and is displayed generally in FIG. 1 as having 1 to i bits. The number of bits in the address field determines the number of devices that can be daisy chained together to form the serial data path. For example, a 2-bit address field would support four devices and a 4-bit address field would support sixteen devices. The length of the address field can be adjusted according to the requirements of a particular design; the present invention is not limited by the choice of the length of the address field. Device data 104 is illustrated in FIG. 1 as containing 1 to j bits. Serial data word 100 is therefore k total bits in length as indicated by 106, where k represents a sum of i and j bits. The size of the device data field 104 is variable and can be adjusted according to the requirements of a given system design; the present invention is not limited by the number of bits selected for the length of the device data field. Neither does the number of total bits in the serial data word 100 limit the present invention.

Additional fields can be included in serial data word 100. For example, in one embodiment it may be desirable to include an endpoint number and a parity bit as well as a type indicator. In one embodiment, an 8-bit end point number, and an 8-bit data field are used. The serial data word or packet may be assembled in any order. In order to achieve the latency reduction, according to the teaching of the present invention, the only requirement on the serial data word is that the device read the address of the serial data word before reading the device data 104. Reading the device address 102 before the device data 104 allows the device to retransmit the serial data word to the next link in the serial data path (daisy chain) without expending time reading the device data when the serial data word's destination is not the device. In one embodiment, the serial data word has a data structure that uses at least two address bits, followed by a type indicator bit, followed by an 8-bit end point number, followed by an 8-bit data field, and ending with a parity bit.

Figure 2:
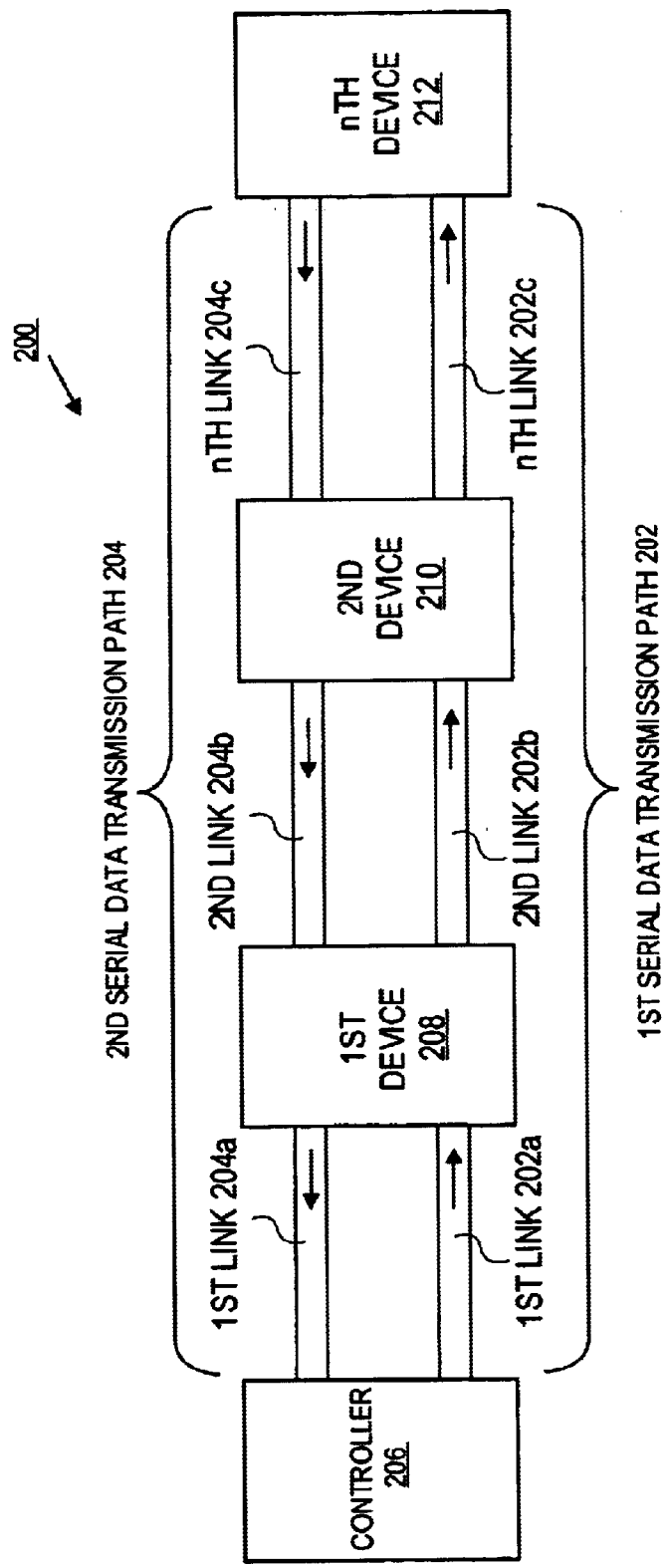
FIG. 2 illustrates a serial data bus architecture utilizing dual serial data transmission paths.

FIG. 2 illustrates a serial data bus architecture utilizing dual serial data transmission paths. With reference to FIG. 2, a 1$^{st}$ serial data transmission path includes a 1$^{st}$ link 202a, a second link 202b, up to and including an $n^{th}$ link 202c. The serial data transmission path 202 can include a general number of links n, limited only by the design of the particular data processing system. The present invention does not impose a limit on the number of devices n.

In one embodiment, a controller 206 transmits a serial data word onto the first link 202a, the serial data word is addressed to one of the devices daisy chained along the $1^{st}$ serial data transmission path 202. For example, $1^{st}$ device 208, $2^{nd}$ device 210, or $n^{th}$ device 212. The $1^{st}$ device 208 connects the $1^{st}$ link 202a with the second link 202b. The $2^{nd}$ device 210 connects $2^{nd}$ link 202b with $n^{th}$ link 202c. The $n^{th}$ link 202c terminates into the last device along the daisy chain, $n^{th}$ device 212. If the serial data word transmitted from the controller 206 is not addressed to the $1^{st}$ device 208, only enough of the device address attached to the serial data word is read by the $1^{st}$ device 208. After determining that the serial data word is not addressed to the $1^{st}$ device 208 the $1^{st}$ device 208 retransmits the serial data word to the $2^{nd}$ device 210 across the $2^{nd}$ link 202b. If the serial data word is addressed to the $2^{nd}$ device 210, then the $2^{nd}$ device 210 reads the rest of the serial data word. If the serial data word was not addressed to the $2^{nd}$ device 210 then the serial data word would be retransmitted by successive devices until the serial data word reached the device to which it was addressed.

Assuming for this discussion that the $2^{nd}$ device is the device to which the serial data word was addressed, the $2^{nd}$ device would then perform error checking and notify the controller 206 if an error condition was in existence. Notification of the controller 206 is accomplished using a $2^{nd}$ serial data transmission path 204. The second serial data transmission path 204 includes a first link 204a and a $2^{nd}$ link 204b up to and including an $n^{th}$ link 204c. The second serial data transmission path 204 is similar to the first data serial data transmission path 202, except that the communication occurs in reverse order across the second serial data transmission path with respect to the first serial data transmission path. Together, both serial data communication paths 202 and 204 form a bi-directional communications link that enables communication to and from the controller and all devices that are daisy chained together.

Figure 3:
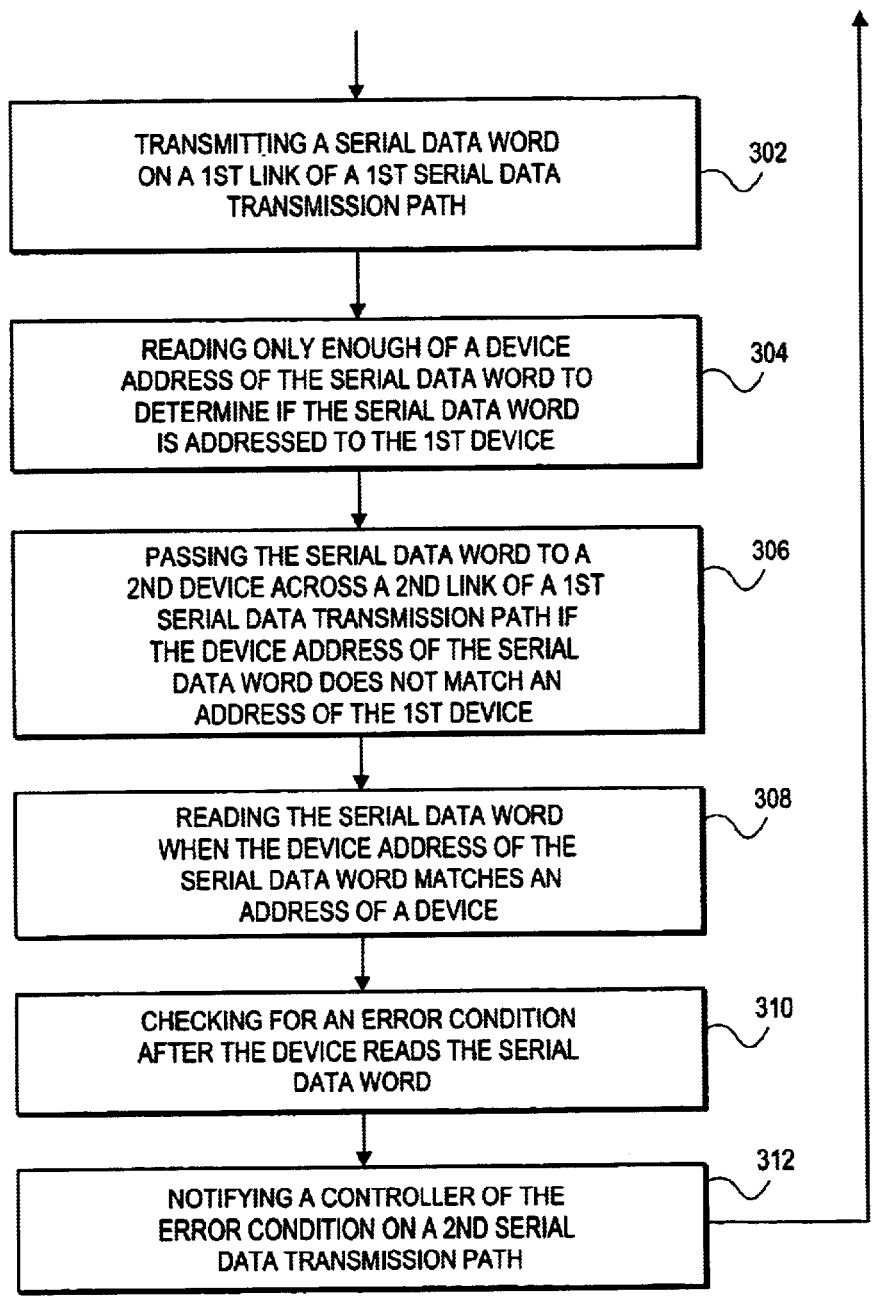
FIG. 3 shows a flow chart for a method according to one embodiment.

FIG. 3 shows a flow chart for a method according to one embodiment of the present invention, which is consistent with the description of FIG. 2 discussed previously. With reference to FIG. 3, transmitting a first serial data word on a first link of a $1^{st}$ serial data transmission path is indicated at 302. The process block 302 describes the communication between the controller 206 and the $1^{st}$ link 202a in FIG. 2. In process block 304 of FIG. 3, a $1^{st}$ device reads a device address of the serial data word. As mentioned previously, the device 208 (FIG. 2) need only read enough of the address as is required for the device 208 to determine whether or not the serial data word is addressed to the device 208. In another embodiment, the device can be configured to read the entire device address 102 (FIG. 1) of the serial data word.

A next process block 306 (FIG. 3) describes passing the serial data word to another device along the serial data communication path. If the device address 102 (FIG. 1) does not match an address of the $1^{st}$ device 208 (FIG. 2) then the serial data word is passed to the next device according to process block 306 (FIG. 3). For example, the serial data word could be passed to the second device 210 from the $1^{st}$ device 208 (FIG. 2).

Process block 308 (FIG. 3) indicates the first time that the entire serial data word will be read by a device. The device data 104 (FIG. 1) in the serial data word 100 is read by a device when the device address 102 matches an address of a device connected to the serial data transmission path 200 (FIG. 2). After the serial data word reaches the correct device, the device checks for an error condition at 310. If an error condition is found, then the device notifies the controller 206 (FIG. 2) via the $2^{nd}$ serial data communications path 204. The controller can then perform the required analysis of the error condition and respond by resending the serial data word or taking other appropriate action.

One or more of the links of the serial data communication path 202a, 202b, 202c, 204a, 204b, and 204c can be wireless links, or the links can be made of a metallic conductor, such as copper. The present invention is not limited by the energy transmission medium used for the links of the serial data transmission path. In one embodiment, all of the links can be made of a metallic conductor. In another embodiment a pair of links (for example, 202a and 204a) could be wireless links with the remaining links being made out of metallic conductors. Alternatively, a pair of links (for example, 202a and 204a) could be made out of metallic conductors and the balance of the links could be wireless. The present invention can be used with a point of entry into a wireless communications network. Any combination is possible; the present invention is not limited by the combination of metallic and non-metallic conductors used for the links of the serial data transmission path.

The present invention can be used in a variety of data transmission applications. For example the present invention is generally applicable in high-speed serial data bus scenarios.

In this description of the invention the term "device" has been used to describe the devices that are daisy chained together along the serial data transmission path. As used herein, the term "device" is generic, providing the functionality of receiving the serial data word, reading the serial data word and retransmitting the serial data word. The device can be referred to as a communications front end. Alternatively, the device can represent components of a data processing system such as a communications front end, a data storage unit, a wireless device, a local area network, a cellular telephone, and an entry point. The devices listed above can incorporate the necessary transmit and receive electronics necessary to communicate with the serial data transmission path, as is well known in the art. For example, a storage device can be configured with network capability that allows it to be daisy chained together with links 202a and 204a, as described in conjunction with FIG. 2.

It will be appreciated that the methods described in conjunction with the figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Thus, a novel method for reducing latency in a high-speed serial data bus is described. Although the invention is described herein with reference to specific preferred embodiments, many modifications therein will readily occur to those skilled in the art. Accordingly, all such variations and modifications are included within the intended scope of the invention as defined by the following claims.

What is claimed is:

1. A method comprising:

reading only enough of a device address of a serial data word to determine if the serial data word is addressed to a first device having an address, wherein the serial data word is transmitted across a first link of a first serial data transmission path to the first device, the serial data word including device data; and passing the serial data word across a second link of the first serial data transmission path to a second device if the serial data word is not addressed to the first device.

2. The method of claim 1, further comprising:

reading the device data of the serial data word if the device address of the serial data word matches the address of the first device.

3. The method of claim 1, further comprising:

performing error checking if the device address of the serial data word matches the address of the first device.

4. The method of claim 3, wherein the performing error checking is performed by the first device.

5. The method of claim 1, further comprising:

notifying a data transmission path controller if the performing determines an error condition associated with the serial data word wherein the notifying occurs on a second serial data transmission path.

6. The method of claim 5, wherein a first link of the second serial data transmission path is selected from the group consisting of a metallic conductor, an optical fiber, a wireless link, and an energy transmission medium.

7. The method of claim 5, wherein a second link of the second serial data transmission path is selected from the group consisting of a metallic conductor, an optical fiber, a wireless link, and an energy transmission medium.

8. The method of claim 1, wherein the first link of the first serial data transmission path is selected from the group consisting of a metallic conductor, an optical fiber, a wireless link, and an energy transmission medium.

9. The method of claim 1, wherein the second link of the first serial data transmission path is selected from the group consisting of a metallic conductor, an optical fiber, a wireless link, and an energy transmission medium.

10. The method of claim 1, wherein the serial data word is in packet format.

11. The method of claim 1, wherein the serial data word has a structure comprising:

an address field; and a data field.

12. The method of claim 1, wherein the serial data word has a structure comprising:

at least two address bits;

a type indicator bit;

an eight bit end point number;

an eight bit data field; and a parity bit.

13. The method of claim 1, wherein the first device is selected from the group consisting of a communications front end, a data storage unit, a wireless device, a local area network, a cellular telephone, and an entry point.

14. A computer readable medium containing executable computer program instructions, which when executed by a data processing system, cause the data processing system to perform a method comprising:

reading only enough of a device address of a serial data word to determine if the serial data word is addressed to a first device having an address, wherein the serial data word is transmitted across a first link of a first serial data transmission path to the first device, the serial data word including device data; and passing the serial data word across a second link of the first serial data transmission path to a second device if the serial data word is not addressed to the first device.

15. The computer readable medium as set forth in claim 14, wherein the method further comprises:

reading the device data of the serial data word if the device address of the serial data word matches the address of the first device.

16. The computer readable medium as set forth in claim 14, wherein the method further comprises:

performing error checking if the device address of the serial data word matches the address of the first device.

17. The computer readable medium as set forth in claim 16, wherein the performing error checking is performed by the first device.

18. The computer readable medium as set forth in claim 14, wherein the method further comprises:

notifying a data transmission path controller if the performing determines an error condition associated with the serial data word wherein the notifying occurs on a second serial data transmission path.

19. A computer readable medium containing executable computer program instructions, which when executed by a data processing system, cause the data processing system to perform a method comprising:

transmitting a serial data word across a first link of a first serial data transmission path to a first device having an address, the serial data word including a device address and device data;

reading only enough of the device address by the first device to determine if the serial data word is addressed to the first device; and passing the serial data word across a second link of the first serial data transmission path to a second device if the serial data word is not addressed to the first device.

20. The computer readable medium as set forth in claim 19, wherein the method further comprises:

reading the device data of the serial data word if the device address of the serial data word matches the address of the first device.

21. The computer readable medium as set forth in claim 19, wherein the method further comprises:

performing error checking if the device address of the serial data word matches the address of the first device.

22. The method of claim 21, wherein the performing error checking is performed by the first device.

23. The method of claim 19, further comprising:

notifying a data transmission path controller if the performing determines an error condition associated with the serial data word wherein the notifying occurs on a second serial data transmission path.

24. An apparatus comprising:

a first device having an address; and a first serial data transmission path coupled to the first device, the first data transmission path including a first link and a second link, wherein the first device to receive a serial data word transmitted across the first link, the serial data word including a device address and device data, the first device to read only enough of the device address of the serial data word to determine if the serial data word is addressed to the first device, the first device to pass the serial data word across the second link to a second device if the serial data word is not addressed to the first device.

25. The apparatus of claim 24, wherein the first device to read the device data of the serial data word if the device address of the serial data word matches the address of the first device.

26. The apparatus of claim 24, wherein the first device to perform error checking if the device address of the serial data word matches the address of the first device.

27. The apparatus of claim 26, wherein error checking to be performed by the first device.

28. The apparatus of claim 24, wherein a data transmission path controller to be notified if an error condition associated with the serial data word is found, wherein the data transmission path controller to be notified on a second serial data transmission path.

29. The apparatus of claim 28, wherein a first link of the second serial data transmission path is selected from the group consisting of a metallic conductor, an optical fiber, a wireless link, and an energy transmission medium.

30. The apparatus of claim 28, wherein a second link of the second serial data transmission path is selected from the group consisting of a metallic conductor, an optical fiber, a wireless link, and an energy transmission medium.

31. The apparatus of claim 24, the first link of the first serial data transmission path is selected from the group consisting of a metallic conductor, an optical fiber, a wireless link, and an energy transmission medium.

32. The apparatus of claim 24, wherein the second link of the first serial data transmission path is selected from the group consisting of a metallic conductor, an optical fiber, a wireless link, and an energy transmission medium.

33. The apparatus of claim 24, wherein the serial data word is in packet format.

34. The apparatus of claim 24, wherein the serial data word has a structure comprising:

an address field; and a data field.

35. The apparatus of claim 24, wherein the serial data word has a structure comprising:

at least two address bits;

a type indicator bit following the at least two address bits;

an eight bit end point number following the type indicator bit;

an eight bit data field following the eight bit end point number; and a parity bit following the eight bit data field.

36. The apparatus of claim 24, wherein the first device is selected from the group consisting of a communications front end, data storage unit, a wireless device, a local area network, a cellular telephone, and an entry point.

37. An apparatus comprising:

a first serial data transmission path having a first link and a second link;

a controller to transmit a serial data word across the first serial data transmission path, the serial data word including a device address and device data;

a first device having an address, wherein the first device is coupled with the first serial data transmission path; and a second device coupled with the first serial data transmission path, wherein the first device to read only enough of the device address of the serial data word to determine if the serial data word is addressed to the first device and if the serial data word is not addressed to the first device then the first device to pass the serial data word across the second link of the first serial data transmission path to the second device.

38. The apparatus of claim 37, wherein the first device to read the device data of the serial data word if the device address of the serial data word matches the address of the first device.

39. The apparatus of claim 37, further comprising:

a device to perform error checking if the device address of the serial data word matches the address of the first device.

40. The apparatus of claim 37, wherein the controller to be notified if an error condition associated with the serial data word is found, wherein the controller to be notified on a second serial data transmission path.

\* \* \* \* \*